(12) United States Patent
Dickinson

(10) Patent No.: US 6,737,974 B2
(45) Date of Patent: May 18, 2004

(54) SHIPPING CONTAINER AND SYSTEM ALONG WITH SHIPPING METHOD EMPLOYING THE SAME

(76) Inventor: Kent H. Dickinson, 6228 Water's Edge Dr., Covington, GA (US) 30014

( * ) Notice: Subject to any disclaimer, the term of this patent is extended or adjusted under 35 U.S.C. 154(b) by 0 days.

(21) Appl. No.: 09/956,478

(22) Filed: Sep. 18, 2001

(65) Prior Publication Data
US 2003/0052032 A1 Mar. 20, 2003

(51) Int. Cl.[7] .............................................. G08B 13/14
(52) U.S. Cl. ............................. 340/572.8; 340/825.49; 235/385; 53/443; 383/42; 206/386; 206/459.5; 206/499; 206/515; 206/526
(58) Field of Search ...................... 340/572.8, 572.1, 340/825.49, 5.8; 235/375, 384, 376, 385; 206/599, 725, 504, 386, 509, 503, 515, 499, 526, 511, 459.5; 53/447, 452, 111 R, 467, 521, 523, 443; 383/5, 396, 42, 50

(56) References Cited

U.S. PATENT DOCUMENTS

| | | | |
|---|---|---|---|
| 4,494,592 A | * | 1/1985 | Bonner ........................... 383/5 |
| RE32,344 E | * | 2/1987 | Wind ........................... 206/599 |
| 4,773,534 A | | 9/1988 | DeHeras et al. ............. 206/709 |
| 5,291,396 A | | 3/1994 | Calcerano et al. ............. 705/1 |
| 5,372,429 A | | 12/1994 | Beaver, Jr. et al. .......... 383/109 |
| 5,417,790 A | | 5/1995 | Petrou ........................... 156/249 |
| 5,473,866 A | * | 12/1995 | Maglecic et al. .............. 53/511 |
| 5,487,471 A | * | 1/1996 | Marchek et al. ............. 206/725 |
| 5,524,760 A | * | 6/1996 | Funk ............................ 206/504 |
| 5,628,858 A | | 5/1997 | Petrou ........................ 156/249 |
| 5,779,035 A | | 7/1998 | Marrelli et al. .............. 206/233 |
| 5,829,229 A | | 11/1998 | Hyatt et al. .................... 53/445 |
| 5,850,963 A | | 12/1998 | Chang ...................... 229/116.5 |
| 5,967,579 A | | 10/1999 | Hebert .......................... 294/74 |
| 5,971,153 A | * | 10/1999 | Bauer et al. ................. 206/494 |
| 5,971,587 A | | 10/1999 | Kato et al. ................... 700/115 |
| 5,979,757 A | | 11/1999 | Tracy et al. .................. 235/383 |
| 5,996,799 A | | 12/1999 | Garreth et al. ............... 206/521 |
| 6,021,392 A | | 2/2000 | Lester et al. .................... 705/2 |
| 6,129,211 A | * | 10/2000 | Prakken et al. ............. 206/750 |
| 6,281,795 B1 | * | 8/2001 | Smith et al. ............. 340/572.1 |

* cited by examiner

Primary Examiner—Benjamin C. Lee
(74) Attorney, Agent, or Firm—Timothy J. Martin; Michael R. Henson; Rebecca A. Gegick

(57) ABSTRACT

A reusable container and method for a shipping system includes a container body, a closure, a removable label and a label panel. The label has an area to receive shipping information and a layer of an adhesive material. The label panel has an exposed surface to which the adhesive adheres but from which the label may be removed without tearing. A locking structure may be provided. A locking member can engage the locking structure to secure contents during shipment. The container may be a flexible pouch that may include an inner cushioning layer and an outer fabric layer. The pouch may be formed of two panels that have a zippered mouth and a grommet allows a cable tie to lockably secure the zipper in a closed position. A signal transmitter can be included with the container. The system includes special cartons and pallets for a plurality of containers.

24 Claims, 5 Drawing Sheets

SHIPPING CONTAINER AND SYSTEM ALONG WITH SHIPPING METHOD EMPLOYING THE SAME

FIELD OF THE INVENTION

The present invention is broadly directed to containers and systems that may be used for shipping parcels in a parcel carrier industry. In addition, the present invention concerns methods used by those carriers to transport parcels between senders and recipients. The present invention especially concerns containers, systems and methods that integrate advantageous and cost saving techniques wherein the shipping pouches/containers and palleting cartons and structures can be reused.

BACKGROUND OF THE INVENTION

A fundamental need of commerce based societies is the transportation of goods from one location to another. The development of various postal systems, first on the national and then on an international basis, established an organized system wherein a carrier, for a price, would convey a parcel from a shipper to a recipient. The service provided by such carriers resulted in increasing demand and expansion of their served customer based. In addition to the governmentally sponsored postal services, private carriers have been organized to transport a wide variety of parcels for paying customers. Such companies include those known as United Parcel Service, Federal Express, DHL, Airborne and Emory, to name a few. The proliferation of such companies demonstrates the increasing need for their services.

In addition to the ordinary demands on the parcel carrier industry, the expansion of internet commerce already has and is expected to continue to place increasing demands on the need to ship small parcels from a merchant to a customer. The role of the parcel carrier is becoming increasingly integral to the success or failure of consumer's on-line experience and business in general. Shippers know the importance of having a dependable carrier who ultimately provides dependable service to the end-use customer.

The shipping trend in recent times has been toward smaller parcels, some of which are breakable but the majority of which are considered non-fragile or non-breakable. Indeed, as much as 65% to 70% of the entire parcel market in the United States may be classified as non-fragile, meaning that the actual products being shipped are resistant to damage if handled with any degree of care. However, traditional shipping techniques as far as packaging the parcels are not varied greatly between fragile and non-fragile items with the sometimes exception of the degree of cushioning in the material used for more fragile items.

For the past 40–50 years, shippers have been conditioned to excessively package parcel shipments because there have been few alternatives. Such excessive packaging leads to increased packing costs. This packaging cost results from two factors. First, the cost of packaging materials is not trivial. Typically, parcels are packed inside a one-time use only container, such as a paperboard carton, with the interior of the container filled with cushioning materials, such as styrofoam "peanuts", shredded paper or other paper based filler, to name a few. Second, there is a substantial time investment in packaging that results from the need to carefully pack and seal the paperboard carton and prepare the shipping documents for the same.

In addition to the problem of cost, packing waste is one of the leading contributors to landfill waste today and is a frustration for both the shipper and the recipient. This results from the need to inventory and dispose of these non-reusable materials. As internet commerce and mobile inventory management processes continue to grow, waste from shipped parcels can only be expected to worsen. This is especially true since a vast majority of parcels are excessively over-packaged with the actual product accounting for only about 25% of the available space inside each paperboard box. This is despite the fact that a majority of products could have been shipped without any packaging materials.

Such wasted space also reduces the volume shipping capacity of carriers, be the air transport or land based transport, such as trucks. The shipping of the packaging waste exhibits both direct costs as well as indirect costs in increased fuel consumption, wear and tear on airports, highways, etc. as well as environmental impact. By reducing the amount of waste materials, such indirect costs could be reduced.

While carriers profess to be interested in understanding the hardships on shippers, the only response to these hardships seems to have been in logistics planning. Little effort has been made to avoid unnecessary effort because the carriers would be required to change the service that they offer. Further, the presence of several dominant players in the carrier industry have virtually dictated the packaging techniques that have been used for the last few decades, with these rules being those that have resulted in the costs discussed above.

Therefore, while current handling methods were acceptable in the past, there has been an increasing need felt for many years to develop better parcel handling techniques. The environmental and financial factors have been suggesting for many years the need for better solutions to providing carrier services. Indeed, even political factors are changing with governmental agencies listing the activities of box packaging and taping as an activity subject for repetitive motion injury. Accordingly, there is an ever increasing need for solutions to reduce or eliminate the liabilities of current parcel packaging and carriage.

SUMMARY OF THE INVENTION

It is an object of the present invention to provide a new and useful container for shipping parcels between locations.

Another object of the present invention is to provide a new and useful shipping system of containers, cartons and pallets that reduce the volume necessary to ship parcels between locations.

It is a further object of the present invention to provide a reusable container that avoids the requirement of excessive parcel cushioning materials.

A further object of the present invention is to provide a simple, reusable container that reduces the time necessary to containerize parcels as well as one that reduces the risk of repetitive motion injury.

It is still a further object of the present invention to provide a shipping system including reusable containers and reusable carton/totes that protect parcels during shipment.

Yet another object of the present invention is to provide a new and useful method for shipping parcels from shippers to recipients that incorporates the containers and system noted above.

It is still a further object of the present invention is to provide a method for shipping parcels that can increase the ease of sorting and tracking such parcels.

According to one aspect of the present invention then, a container is provided that is adapted to receive a parcel for shipment to an intended recipient. Broadly, this container includes a container body that has an interior and a mouth communicating with the interior. A closure is provided that is movable between an open position such that the parcel may be inserted and removed from the interior and a closed position to retain the parcel in the interior as a received parcel. A removable label is also provided and includes a strip constructed of a selected strip material along with an area to receive information corresponding to an address of the intended recipient. The label also has a layer of selected adhesive. The container has a label panel secured to the container body with the label panel including an exposed surface portion formed of a material to which the selected adhesive will adhere sufficiently to retain the label on the container body during shipment yet from which the label may be forcefully removed without tearing the strip of material.

In one embodiment of the invention, the container is in the form of a flexible pouch. The pouch includes first and second body panels joined about a majority of their periphery thereof to define a sealed edge with an unjoined portion defining the mouth. The closure of such pouch can then be a zipper having a pull-tab. A first grommet may be disposed on the first body panel and a second grommet made to be disposed on the second body panel with each of the first and second grommets being located proximately to the pull-tab of the zipper when the zipper is closed. This defines a locking structure for the pouch. A locking member is then provided and is operative to engage the first and second grommets and the pull-tab thereby to secure the zipper in the closed position. This locking member may be a cable tie that extends through the grommets and engages the pull-tab, such as extending through the eye thereof. The first and second body panels may be formed with a multi-layered construction that includes a cushioning layer interposed between first and second fabric layers.

The label panel, as noted, has a release material that allows the adhesive label to be removed so that the container may be reused. Here, the label panel may be formed by a layer of plastic material that is coated with polytetrafluoroethylene. This label panel may be affixed by sewing or other technique to the container body. In addition, a signal transmitter may be secured to the container body such as, but not limited to the enclosing of the signal transmitter between the layers of the body panels of a multi-layered constructed pouch. This signal transmitter, such as an RF transmitter, can be used to track the parcel through shipping check points and may also provide electronic addressing capability.

The shipping system of the present invention incorporates a container such as the containers discussed above. Here, the system includes a plurality of labels and a plurality of flexible containers so a label may be placed on and selectively removed from the flexible container after shipment. A plurality of cartons or totes are also provided for the system with each carton having a bottom and a surrounding sidewall to form a carton interior. Each carton is adapted to receive a plurality of the flexible containers with received parcels in the carton interior thereof to form a filled carton. Further, a plurality of the filled cartons are stackable one on top of another as a stacked ensemble. The system then includes a plurality of support pallets with each support pallet adapted to support at least one stacked ensemble of filled cartons placed thereon a supported ensemble. It is desirable, though, that each pallet support a plurality of supported ensembles. In any event, a plurality of cover pallets are also provided with each cover pallet adapted to be placed over the one or more supported ensembles on the support pallet. Connector assemblies are then adapted to fasten a respective support pallet to a respective cover pallet as a pallet pair thereby to secure the pallet pair together to define a palletized load. The support pallets and a cover pallets may have a common construction. Moreover, they may be constructed so that two palletized loads may be stacked one on top of another with adjacent ones of the support pallets and cover pallets interlocking with one another. This interlocking structure may be provided by rails on the support pallets and cover pallets.

The method of shipping parcels from a shipper located at a respective origin location to an intended recipient each located at a respective designation location may be summarized by certain steps of such method. First, at a respective location correlated to a respective shipper and in any order, the method includes packing each of the parcels to be shipped by the respective shipper in an individual reusable container; labeling each of the containers to be shipped by the respective shipper with information corresponding to an address of a respective intended recipient; and closing each container with the respective parcel therein to define a shipping package. These steps are repeated for each respective shipper. If desired, the step of packing each of the parcels can be accomplished by placing it in flexible pouch that defines the reusable container therefor.

The shipping packages are then place in carton totes that each have a bottom and a surrounding side wall forming an interior. Such carton tote, upon being filled with shipping packages, defines a filled carton tote with this step being accomplished at either the respective origin locations or at a regional collection center. The plurality of filled carton totes are conveyed to a centralized distribution center. At the centralized distribution center, the shipping packages are removed from the carton totes. The shipping packages are then sorted by geographic region corresponding to the destination addresses thereof to define regionalized shipping packages. The regionalized shipping packages are replaced in carton totes to define regionalized filled carton totes. The regionalized filled carton totes are then conveyed to respective regional distribution centers. At each regionalized distribution center, the shipping packages are removed from the regionalized filled carton totes. The shipping packages are sorted by destination addresses and delivered from the regional distribution center to the destination address.

According to one embodiment of the method, each said container is provided with a label panel secured thereto, said label panel including an exposed surface portion formed of a release material. Here, the step of labeling may be accomplished by placing information corresponding to the address of the respective recipient on a removable strip constructed of a selected strip material and having a layer of a selected adhesive. The adhesive is selected to adhere sufficiently to the release material to retain the label on the container body during shipment yet to be able to selectively release from the release material without tearing said strip material to define a labeled package. This method then can include a steps of removing the removable strip from at least some of said labeled packages at a respective destination location to define recycled containers and reusing at least some of said recycled containers for subsequent packaging and shipment of parcels.

The method of shipping parcels can also be used where each said container is provided with a signal transmitter secured thereto with each said signal transmitter operative to transmit a unique identifier signal. Here, the step of labeling each container can be accomplished by correlating the respective unique identifier signal with the respective information corresponding to the address of the respective intended recipient.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

According to the present invention, then, a container is provided, and this container is adapted to receive a parcel for shipment to an intended recipient. This container forms part of a system that includes a plurality of containers along with cartons or "totes" that may be palletized between support and cover pallets during transportation. Moreover, the present invention includes a shipping method that incorporates and described herein.

Figure 1:
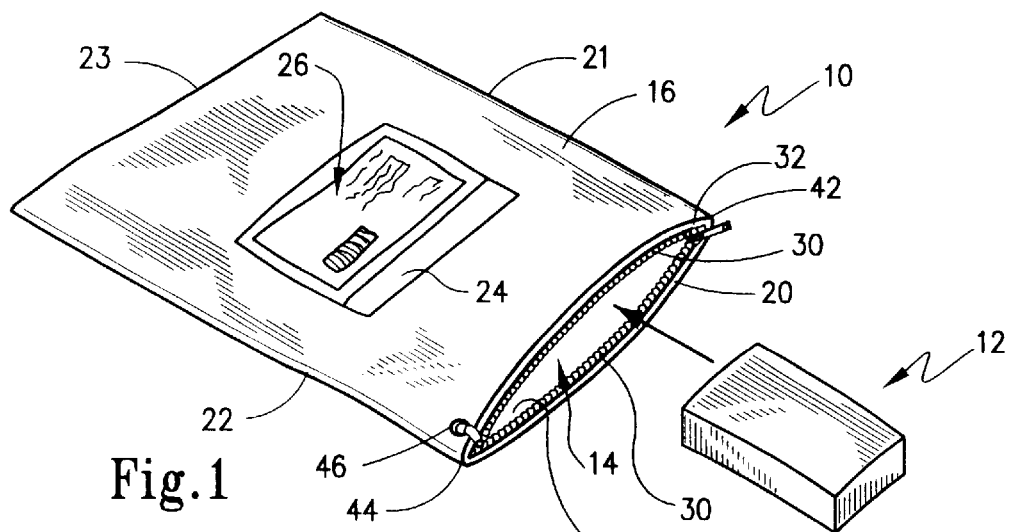
FIG. 1 is a perspective view showing a representative parcel being inserted into a container according to an exemplary embodiment of the present invention with the container being in an opened state.

With reference first to FIG. 1, a container 10 is shown which is in the form of a flexible pouch that is adapted to receive a parcel 12 in the interior 14 thereof. Container 10 is shown to have a front pouch panel 16 and a back pouch panel 18 which are rectangular in shape and are joined about three edges, 21, 22 and 23 which are located at the perimeter thereof. Panels 16 and 18 are opened along a portion of the perimeter to define a mouth 20 through which parcel 12 may be inserted into interior 14 thus to define a received parcel. Front panel 16 supports a label panel 24 that is affixed to container 10 in any convenient manner, such as adhesive, sewing, etc. A shipping label 26 may then be removably secured to label panel 24, as described more thoroughly below. A zipper 30 includes a pull-tab 32 and is shown in an open position so that mouth 20 is open.

Figure 2:
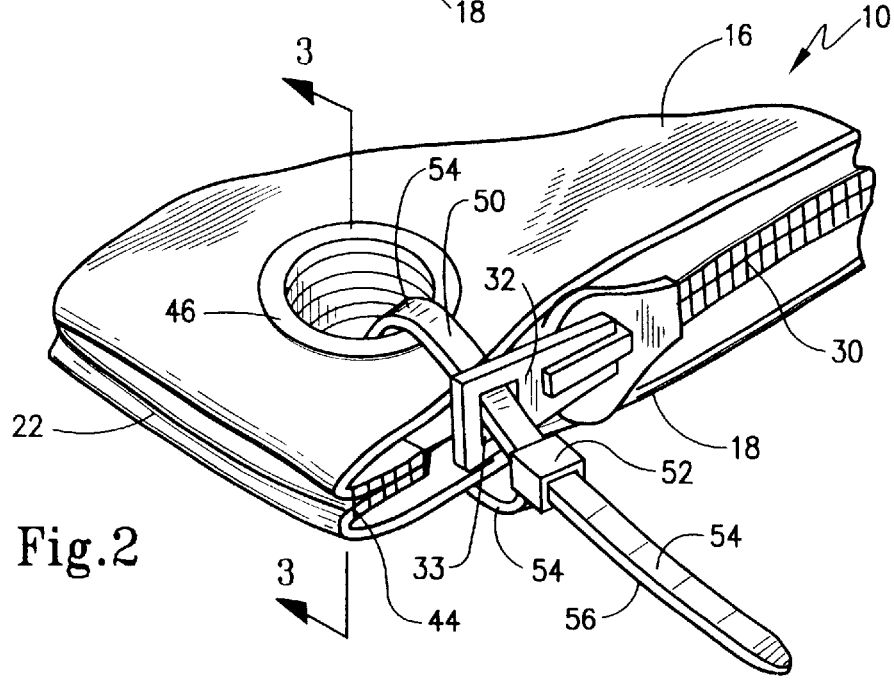
FIG. 2 is a perspective view of the locking structure according to the exemplary embodiment of the present invention with the container shown in the closed state.
Figure 3:
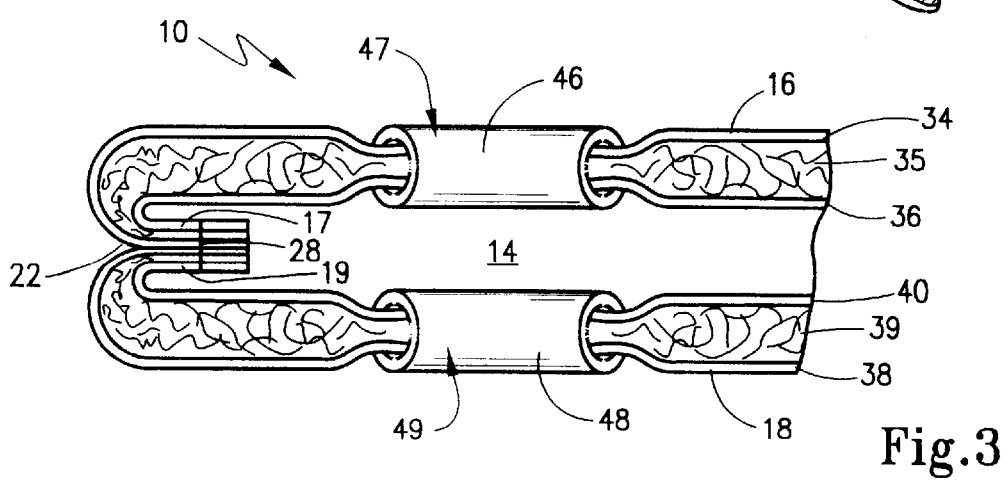
FIG. 3 is a cross-sectional view taken about lines 3—3 of FIG. 2.

With reference now to FIGS. 2 and 3, it may be seen that the perimeter edges, such as edge 22, is formed by sewing margins 17 and 19 of panel 16 and 18 together, as is known in the art. Furthermore, it may be seen that front panel 16 is formed out of fabric layers 34 and 36 with a cushioning layer 35 sandwiched or interposed therebetween. Likewise, back panel 18 is formed by a pair of fabric layers 38 and 40 with a cushion layer 39 interposed therebetween. In this embodiment, each of panels 16 and 18 are flexible. Outer fabric layers 34 and 38 as well as inner fabric layers 36 and 40 may be formed of any suitable material, but it should be formed of a sufficiently durable material so that container 10 may be reused many times. For example, each of the fabric layers 34, 36, 38 and 40 may be formed of a heavy gauged cotton cloth or canvas material, but other suitable materials can be substituted as would be within the ability of the ordinarily skilled person in this art. Cushion layers 35 and 39 may be formed by a cotton batting, or other material known in the packing arts, of suitable thickness so as to provided some soft cushioning effect for a received parcel placed within the container 10.

With reference now to FIG. 2, it may be seen that container 10 may be placed in a closed state by manipulating zipper 30 to close mouth 20. When open, pull-tab 32 is thus located at one corner 42 of container 10 but, when closed, it is located proximately to a second corner 44 of container 10. Front panel 16 is provided with a metal grommet 46 with metal grommet 46 being located proximately to corner 44. Similarly, back panel 18 is provided with a metal grommet 48 that is also located proximately to corner 44 so that metal grommets 46 and 48 are in opposed, facing relationship to one another. Moreover, grommets 44 and 46 are located proximately to pull-tab 32 when zipper 30 is zipped shut with container 10 being in the closed state.

From the foregoing, it should be appreciated that zipper 30 provides a closure for container 10 that is movable between an open position such that the parcel may be inserted and removed from the interior 14 of container 10 and a closed position so as to retain the parcel in the interior 14 as a received parcel. It should be understood, however, that closures other than zipper 30 are contemplated by this invention.

In order to retain the closure (such as zipper 30) in the closed position, a locking structure is provided. For the representative structure described above, a portion of this locking structure is provided by grommets 46 and 48. In this exemplary embodiment, the locking structure is completed by the use of a cable tie 50 of the type known in the art. Cable tie 50 has a locking head 52 provided with a ratcheting locking mechanism (not shown) with locking head 52 located on an end of an elongated tail 54. Tail 54 is adapted to extend through the openings 47 and 49 of grommets 46 and 48, respectively and through an eye 33 of pull-tab 32. Tail 54 is then inserted through locking head 52 so that ratchet teeth 56 engage the locking structure in locking head 52, as is well known in the art of cable ties. At this point, the closed or "sealed" container 10 cannot be opened without either damaging cable tie 50 or zipper 30 or otherwise compromising the construction of container 10. That is, the sealed container is resistant to any tampering during the ordinary course of shipment of parcel 12. To this end, also, panels 16 and 18 should be opaque such that a person may not readily view the contents of the received parcel 12.

Figure 4:
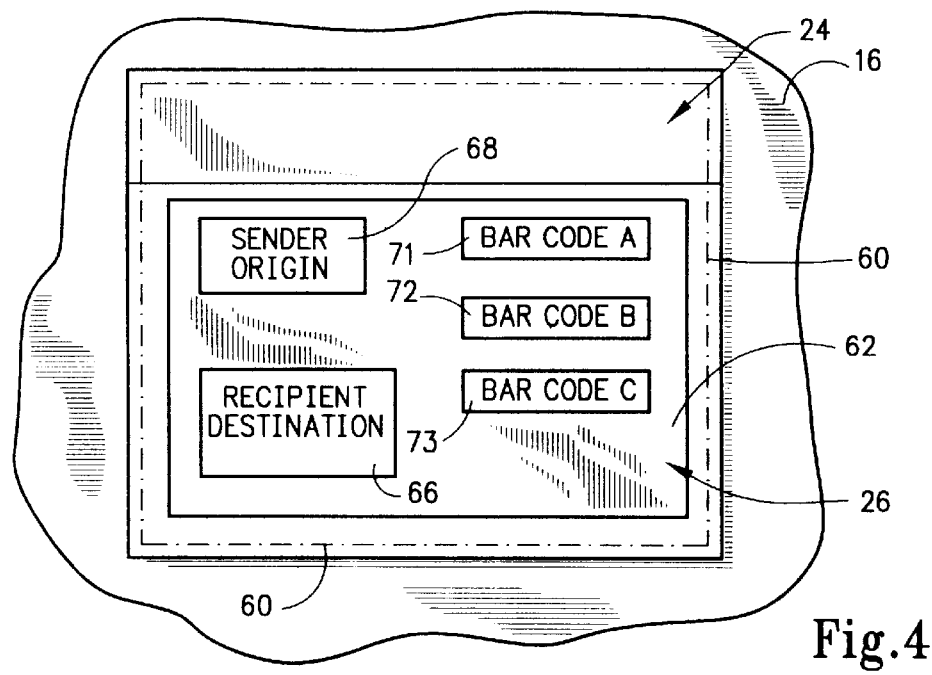
FIG. 4 is a top plan view of the label panel according to the present invention with a diagrammatic representation of a shipping label secured thereto.
Figure 5:
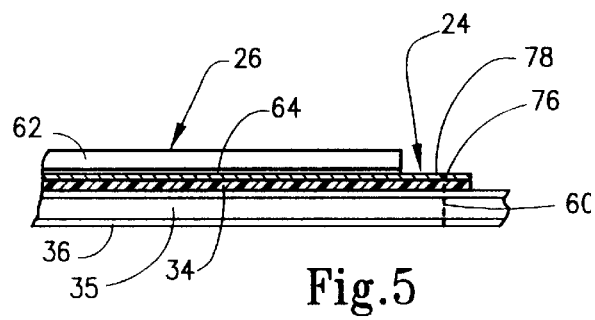
FIG. 5 is a cross-sectional view showing the label panel on a pouch panel with a shipping label secured thereto.

Looking now at FIGS. 4 and 5, it may be seen that label panel 24 is affixed to front panel 16, here by stitching 60, although it should be understood that other attachment techniques are known. As is shown in FIG. 5, removable label 26 is formed as a strip 62 of a selected strip of material, such as paper, that includes a layer 64 of a suitable adhesive material that is adapted to adhere to label panel 24. Label 26 can be a standard address label typically used on paperboard cartons and the like. With reference again to FIG. 4, label 26 includes an area 66 located on strip 62 with area 66 adapted to receive information corresponding to the address of an intended recipient for the parcel. Strip 62 also has an area 68 adapted to receive information corresponding to the address of the sender. In addition, areas, such as areas 71, 72 and 73 may be provided for bar code information that can provide an identifier for the particular package as well as a code for the sender and the recipient, including the recipient's address. Thus, for example, bar code "A" as referenced in area 71 may be information that identifies a tracking number for the package. Bar code "B" corresponding to area 72 can be information including the name of the recipient and the recipient's address. Finally, bar code "C" can be information corresponding to the sender and the sender's address.

Label 26 is adapted to be secured to label panel 24 in a manner so that the adhesive layer 64 will adhere sufficiently to retain label 26 to the container body during shipment yet from which the label may be forcefully removed without normally tearing strip 62 during removal. To this end, and with reference again to FIG. 5, it may be seen that label panel 24 includes a layer, such as layer 76, of a substrate material such as a plastic material that is surfaced with a coating or layer of release material such as polytetrafluoroethylene or other suitable material. Accordingly, it should be appreciated that the release material 78 be selected to interact with adhesive material 64 along with the composition of strip 62 such that label 26 is firmly yet releasably secured to container 10. This allows label 26 to remain on container 10 throughout shipment yet permits label 26 to be removed from label panel 24 so that container 10 may be reused numerable times.

Figure 6:
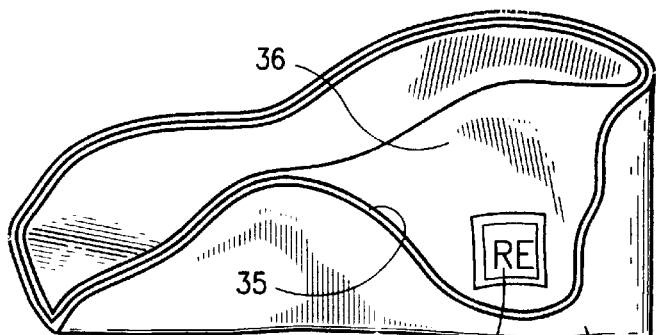
FIG. 6 is a perspective view, partially broken-away showing the incorporation of an RF transmitter in the container of FIG. 1.

As noted above, bar code "A" is provided as a tracking member for the particular container during shipment. A more permanent identifier may also be provided, as is shown in FIG. 6. Here, a radial frequency transmitter 80 is shown embedded between ears 35 and 36 of front panel 16 and held in position in any convenient manner. Transmitter 80 is of a type known in the art, such as those known as "presence detection" and "RF Tags with proximity" that detect location and piece count. These devices each generate a signal of a unique identifier that identifies the particular container 10 containing that particular transmitter 80. Thus, the code for transmitter 80 provides a tracking identifier code that is broadcast and that may be picked up by a suitably tuned receiver in a localized area. Accordingly, a carrier may employ receivers to monitor the whereabouts of a particular container 10.

In the operation of transmitter 80, the carrier encodes data corresponding to the sender and the receiver that is correlated to the signal identifier transmitted by transmitter 80 at the time of pick-up of a particular package from a sender. Then, at any point along the shipment of such package the detection of the radial signal from transmitter 80 who will identify the location of the package. This could occur, for example and without limitation, by monitoring shipping vehicles, centralized distribution points, regionalized distribution points and the like so that the physical location of the container 10 may be monitored at all times. By way of illustration, the shipper could scan the contents of a truck containing literally thousands of containers 10 with the output of the respective transmitters 80 being monitored by a computerized system so that the identification of each container 10 within that truck could be recognized. Moreover, at a centralized distribution point, a scanning receiver could monitor the sorting of a plurality of containers 10 so that the scanning receiver would register when each respective container passed thereby and was repalletized for shipment to a regional center. Similar procedures could take place at the regional centers as well as in trucks at regionalized locations.

While low-power RF transmitter microchips are readily available at a cost that permits their use in reusable packages, they typically have power sufficient only for localized scanning and sorting. It is contemplated by the present invention that higher power RF transmitters may be employed where cost effective. Such technology can provide sufficient signal strength for global tracking, even of individual containers. Thus, the shipper and the carrier could access the location of any given shipped package at any time desired.

Moreover, it should also be understood by the ordinarily skilled person in this field that the sender itself could provide computerized input of its own sending address as well as the recipient's address with this information being correlated to the identifier of the package as defined by the identifier signal of transmitter 80. Where labels 26 are employed, this coding would be of use in the event a label 26 became prematurely removed from a package. By providing such data base to the shipper, the shipper could eliminate the need for the physical addressing of the sender origin and the recipient designation in areas 68 and 66 as well as the bar code information in areas 71, 72 and 73. That is, a central computer system would store the sender's address, the recipient's address and the package identification number correlated to one another. This would also permit automated sorting of packages at a central or regional distribution point. A scanning receiver at any of these locations could interface with sorting equipment so that, as the identity of a package is detected, the centralized computer system would supply routing information corresponding to the recipient's address, and the automated sorting equipment could then direct the package to the correct region. At a regional center, then, a similar process would occur. Here, a scanning transmitter could identify a package according to its transmitted identifier and, with this information, could automatically direct the package to the correct recipient's address.

Figure 7:
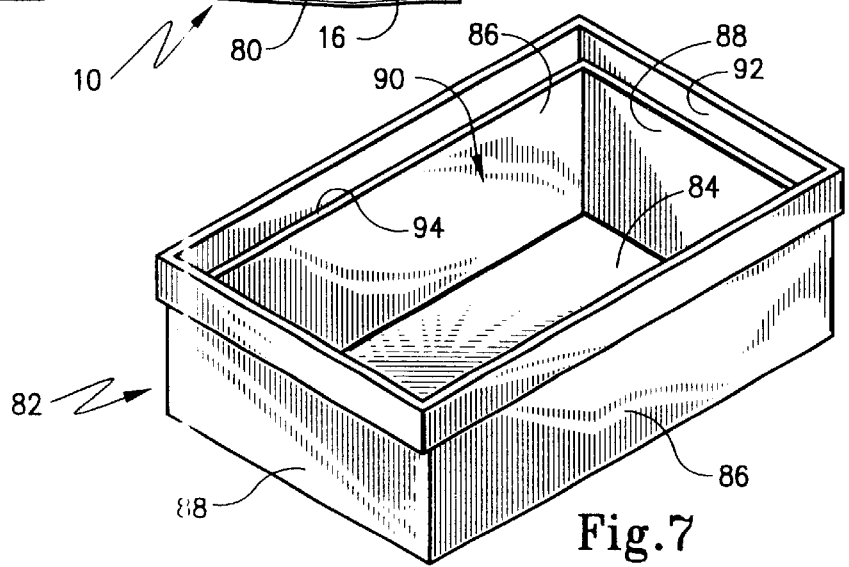
FIG. 7 is a perspective view of a carton that is adapted to receive a plurality of containers of FIGS. 1–5.

In any event, it is desirable that a plurality of containers 10 be placed in a common carton for shipment. Thus, as is shown in FIG. 7, a suitable carton or tote 82 is shown with carton 82 adapted to receive a plurality of containers 10. Here, carton 82 has a bottom wall 84, a pair of sidewalls 86 and a pair of end walls 88 so as to form an open interior 90 that receives containers, such as container 10. An upper edge 92 is enlarged so as to form a shoulder 94 that is sized so that a plurality of cartons 82 may be stacked, one on top of another. To this end, a bottom portion 84 of an upper carton 82 will nest with the top portion of a lower adjacent carton 82 with bottom wall 84 resting on the shoulder 94 of a lower adjacent carton 82.

Figure 8:
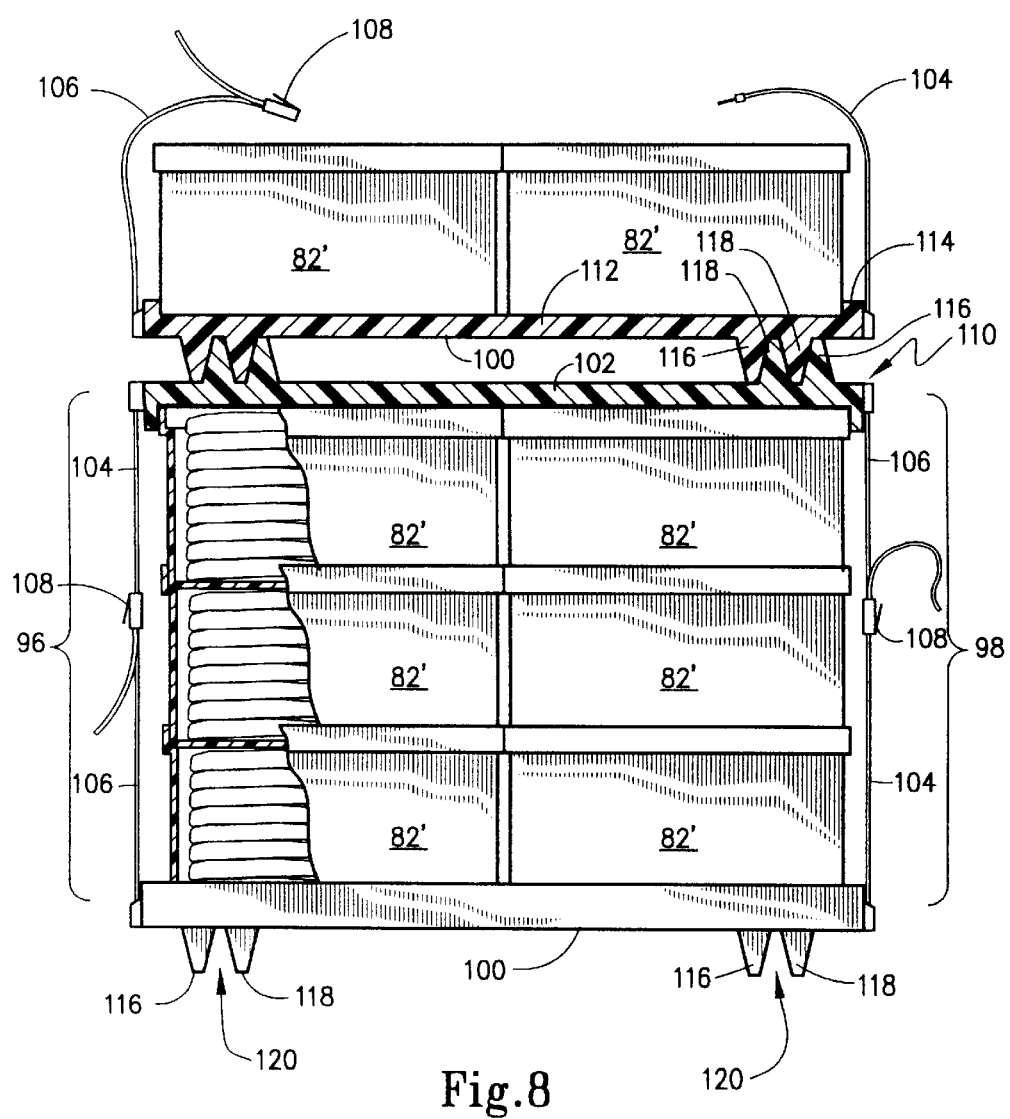
FIG. 8 is an end view in elevation, and partially broken-away and partially in cross-section showing ensembles of stacked and filled containers on pallets for shipments.

A first stack ensemble 96 of filled cartons 82' as well as a second stacked ensemble 98 of filled cartons 82' are shown in FIG. 8. While two such stacked ensembles 96, 98 are shown, it should be appreciated that, in use, four stacked ensembles would be supported on a support pallet 100 that is adapted to support at least one stacked ensemble of filled cartons 82' placed thereon as a supported ensemble. A cover pallet 102 is placed on the top of the stacked ensembles 96 and 98 and are secured together by a connector assembly formed by tie-downs 104 and 106 interconnected by a fastener 108 of a type similar to car seat belts which may securely yet releasably secure a pair of pallets 100, 102 as a pallet pair thereby to define a palletized load 110.

The use of cartons or totes 82 offers a special benefit where the flexible pouches or containers 10 are employed. The cartons 82 provide confined spaces for the otherwise loose containers. The rigidity of the cartons helps protect the parcels against crushing that might otherwise occur if the shipments were loaded in an unconfined manner or in a larger bin. Moreover, the rigid, opaque walls of the carton/ totes resist theft of the parcels. Theft is also deterred by the palletized loads since securing the cover pallet to the support pallet acts to encase the stacked ensembles in a manner that denies easy access to the interiors of the carton/totes. The palletized loads, however, when loaded on a carrier, such as a truck, do not permit significant load shifts during transit due to the relatively small volume of the interior of each carton/tote. This adds to the stability and safety of the present system.

Further, it is desirable that each of cover pallets 102 be constructed as a common construction with support pallets 100 such that the cover pallet 102 is simply an inverted support pallet 100. To this end, and is shown in FIG. 8, such a pallet 100 includes a base 112 and upstanding peripheral rim 114 dimensioned sufficiently so that the filled containers 82' may be nestably received therein. The peripheral rim 114 must be dimensioned sufficiently to accommodate the enlarged upper edge 92 of each carton 82 as the largest horizontal dimension of the stack ensembles of cartons. Further, it is desired that more than one pallet may be stacked on top of each other. To this end, when two palletized loads are stacked on top of one another as is shown in FIG. 8, it is desired that the cover pallet 102 interlock with an upwardly adjacent support panel 100. To this end, a plurality of rails 116 and 118 are provided with each rail 116, 118 being spaced apart to form a channel 120 that is sized to receive a rail 118 therein. This interlocks the pallets together for stability during carriage.

Figure 9:
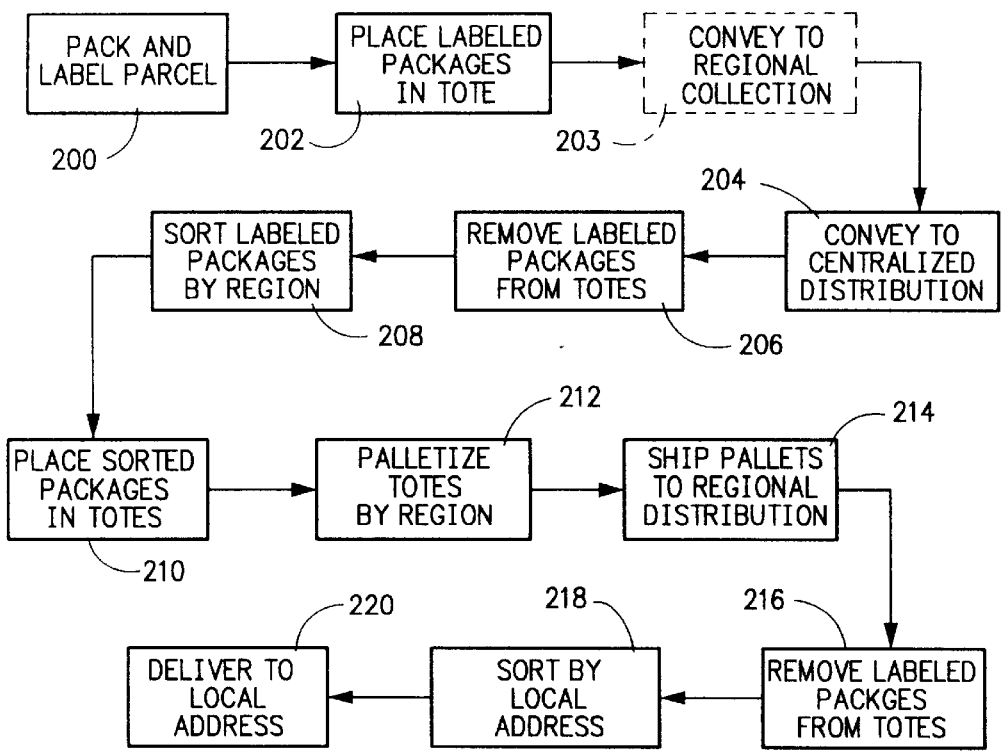
FIG. 9 is a diagrammatic view of a generalized shipping method according to the present invention.

With reference now to FIG. 9, a generalized diagram showing the method according to the present invention is depicted in FIG. 9. Here, the steps of packing and labeling each of the parcels is shown to occur at step 200. This occurs at a respective origin location for a respective shipper. Thereafter, the labeled packages or parcels are placed in a carton or tote at step 202. It should be understood that, should a particular shipper sending a plurality of parcels, the shipper may fill one or more totes with labeled packages to form filled carton totes. Alternatively, an employee of the carrier may fill totes with labeled packages from one or more shipper as the employee receives the same. Label-ready containers 10 can be supplied by the carrier at the time of package pick-up, or they can be inventoried at the shipper's premises.

In any event, the packing and labeling of the parcels, as step 200, is accomplished by packing each of the parcels to be sent in an individual reuseable container that is provided with a label panel, labeling each of the containers with information corresponding to an address of a respective intended recipient and closing each container with a respective parcel therein as a shipping package. To this end, the label panel should include an exposed surface portion formed of a releasable material, as described above, but the label including a removable strip constructed of selected strip material having a layer of adhesive thereon. Again, the release material and the adhesive are selected so that the label will be retained on the container body during shipment yet may be selectively released without tearing of the strip material so that the container can be reused. However, as discussed below, the packages could be "labeled" electronically by way of RF signal identifiers. Therefore, for purposes of this invention, the term "labeling" refers to any technique for correlating specific address information to a specific package.

After the labeled packages are placed in totes, they are conveyed to a centralized distribution location, as indicated at step 204. The labeled packages are removed from the totes at step 206 and the labeled packages are sorted by region at step 208. The sorted packages are then repacked in totes, at step 210 and the totes are palletized by region at step 212. These pallets are then shipped to the corresponding regions, at step 214. After reaching the specified region, the packages are removed from their respective totes at step 216 and are resorted, at step 218 by local address. Finally, the packages are delivered to the local address at step 220.

As is shown in phantom in FIG. 9, a regionalized collection location may be employed, at step 203, so that the labeled package after being first placed in a tote from the shipper, are conveyed to a regional collection location after which they are conveyed to the centralized distribution. Here, by way of example, a centralized distribution may be located in Memphis, Tenn. Regional carrier locations could be located in Atlanta, Ga. and Denver, Colo. For a hypothetical shipment from Athens, Ga. to Boulder, Colo. would take place by the carrier acquiring the package in Athens, Ga. and placing it in a tote at that location. The totes would then be conveyed to regional collection in Atlanta, Ga. after which they would be conveyed to central distribution in Memphis, Tenn. In Memphis, Tenn., the labeled packages would be removed, sorted, replaced in totes and palletized with the particular package in this example being palletized according to the regional Denver, Colo. region. All of the pallets for Denver, Colo. would then be shipped to that regional location and the labeled packages would be removed from the totes in Denver, Colo. All of the labeled packages for the Denver, Colo. region would then be removed from their respective totes and sorted by local address after which they would be delivered. It should be understood, of course, that any number of intermediate regional locations may be employed. Thus, for the hypothetical example, all packages for Boulder, Colo. may be conveyed from Denver to a sub-regional distribution location in Boulder, Colo. after which they would be sorted by localized address.

Figure 10:
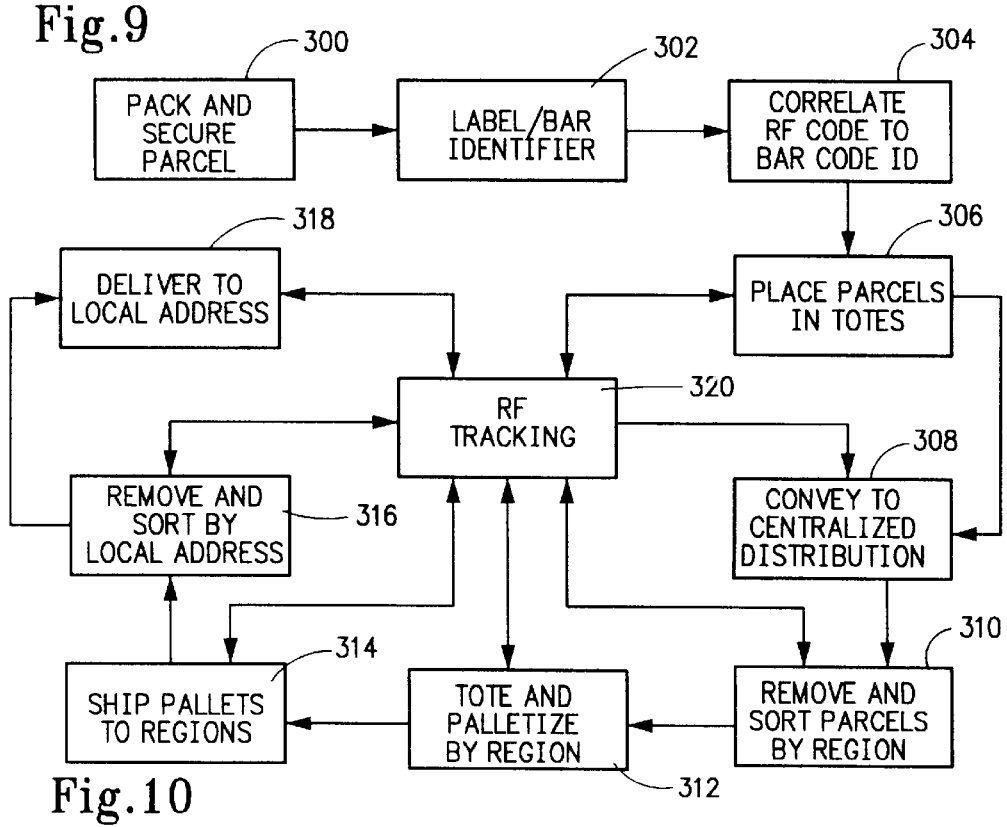
FIG. 10 is a diagrammatic representation of the shipping method according to the present invention incorporating automated tracking.

As also noted with respect to a container containing an RF transmitter, the method can include additional steps. Here, as is illustrated in FIG. 10, the label packages may be packed, at step 300 which can include the step of securing the containers such as by use of cable ties 50. The packages are then labeled with a bar code identifier. The bar code identifier is correlated to the RF code of the transmitter 80, as is shown at step 304. After correlating the RF code of the particular container to its bar code identification, a plurality of labeled packages are placed in totes, as shown at step 306. These totes are then conveyed to a centralized distribution, at step 308, where they are removed and sorted by region, as indicated at step 310. Again, the labeled packages are toted and palletized by region, at step 312, and the pallets are then shipped to regions at step 314. At the regional locations, the labeled packages are removed and sorted by local address, as shown at step 316, and then delivered to the local address as shown at step 318. RF tracking, indicated at 320, can interface with the process at any point after step 304 where there has been a correlation made between the RF code of the package and the bar code identifier or other address indicator.

Accordingly, any particular package can be interrogated at step 306–318 so that a package at any stage of the distribution process may be located by the carrier. This, of course, would be accomplished by tracking receivers which would monitor the RF code of each package passing thereby with this information be passed along to a centralized computer system so that the computer system would maintain data corresponding to the last detected location of any particular package. Moreover, the carrier could perform a real time scan, for example, of a truckload of pallets, to detect the RF code for each of the individualized labeled packages in a carrier load to determine if the respective package was present. This would allow very accurate carrier-to-customer information with respect to any particular package during the entire distribution process.

Figure 11:
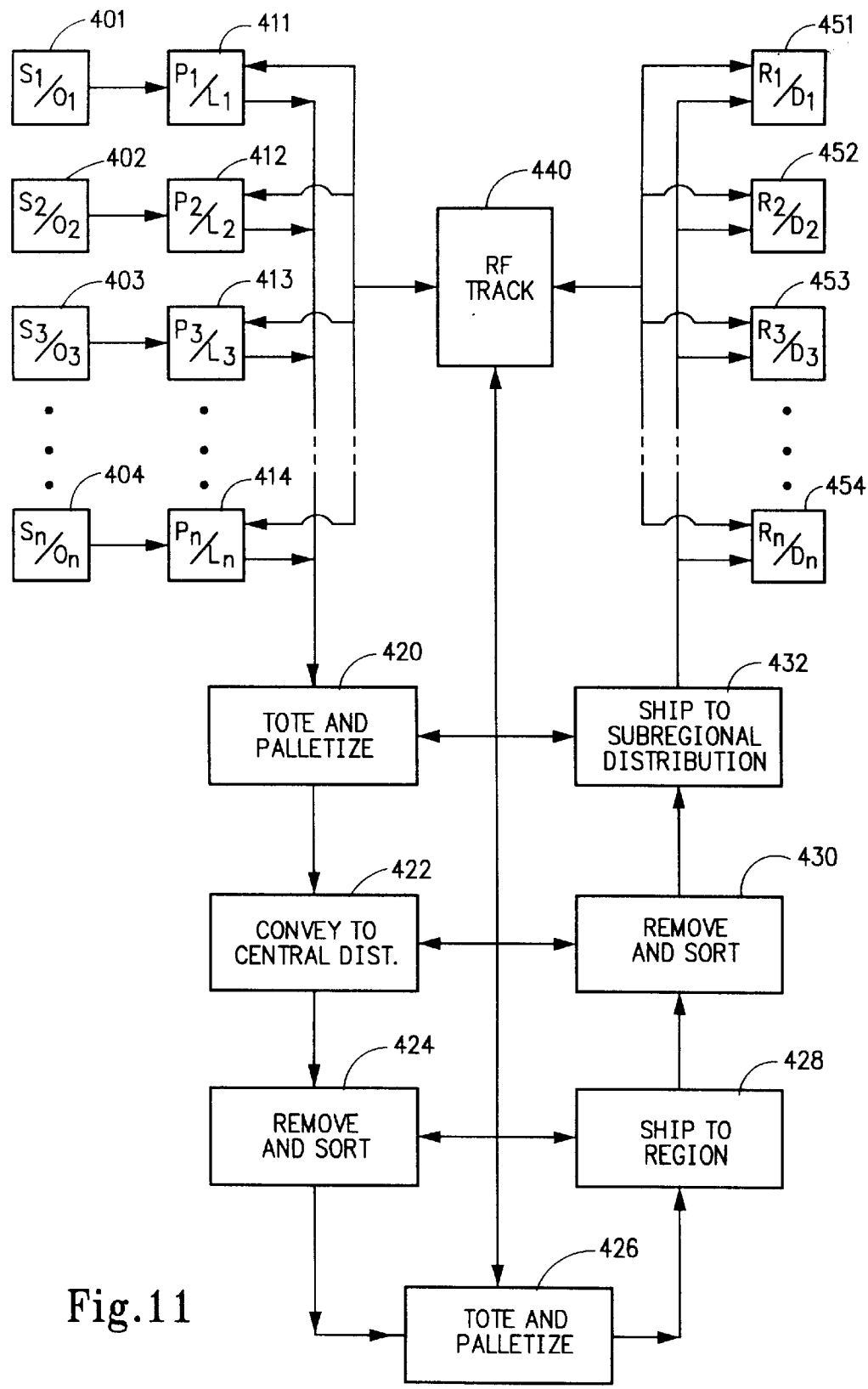
FIG. 11 is a diagrammatic view of the shipping system of the present invention for a plurality of senders and a plurality of recipients.

Accordingly, as represented in FIG. 11, it is contemplated that the method according to the present invention will be employed by a plurality of shippers designated as $S_1$ to $S_n$ as shown at 401, 402, 403 and 404. Each of these shippers are located at a shipping address or origin address $O_1$–$O_n$. The parcels would then be packed and labeled as shown at 411–414, and it should be understood that each of the packages there is a label corresponding to a particular destination address $D_1$–$D_n$ as shown at steps 451–454. It should be understood that each sender may send a plurality of packages for a plurality of destinations. All of the labeled packages are placed in totes and palletized as shown at step 420. This can occur at a shipper's location, at a regional collection point in the distribution chain or at other locations that are normally employed by carrier systems. The labeled packages are then conveyed to centralized distribution at step 422 after which they are removed and sorted, at step 424. This can be by automated equipment wherein the RF tracking, indicated at 440, can monitor the position of a package according to its RF code and can sort the packages by RF code according to the region to which they are to be carried. The labeled packages are then re-toted and palletized, at step 426 and shipped to regional distribution, at step 428. the labeled packages are removed and resorted, at step 430 and conveyed to sub-regional distribution, if desired, at step 432. Thereafter, they are delivered to recipients "$R_1$–$R_n$", each respectively located at destination addresses $D_1$–$D_n$. Here, again, as noted above, RF tracking can locate and monitor the progress of any labeled package once it has been labeled at a labeling step 411–414.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A shipping system adapted to be used to transport parcels between a sender location and a recipient location, comprising:
    (A) a plurality of flexible containers each having an interior adapted to receive a parcel for shipment to an intended recipient, each said container including:
        (1) first and second flexible body panels joined about a majority of the perimeter thereof to define a container body having a sealed edge with an unjoined portion defining a mouth communicating with the interior;
        (2) a closure movable between
            (a) an open position such that a parcel may be inserted into the interior and removed from the interior and
            (b) a closed position to retain the received parcel in the interior as a received parcel;
    (B) a plurality of cartons each having a bottom and a surrounding side wall forming a carton interior, said surrounding side wall including a shoulder structure located proximately to an upper edge thereof,
        (1) each said carton adapted to receive a plurality of said flexible containers with received parcels in the carton interior thereof as a filled carton;
        (2) a plurality of said filled cartons being stackable one on top of another as a stacked ensemble such that a bottom portion of an upper carton will nest with a top portion of a lower carton with the bottom of the upper carton resting on and supported by the shoulder structure of the lower carton thereby to enclose the interior of the lower carton;
    (C) a plurality of support pallets, each said support pallet adapted to support at least one stacked ensemble of filled cartons placed thereon as a supported ensemble;
    (D) a plurality of cover pallets, each said cover pallet adapted to be placed over at least one supported ensemble, thereby to enclose the interior of an uppermost carton in the supported ensemble; and
    (E) connector assemblies adapted to fasten a respective said support pallet to a respective said cover pallet that is positioned over the supported ensemble as a pallet pair thereby to secure said pallet pair together to define a palletized load.

2. A shipping system according to claim 1 wherein said support pallets and said cover pallets have a common construction.

3. A shipping system according to claim 2 wherein said support pallets and said cover pallets are constructed such that two palletized loads may be stacked one on top of another with adjacent ones of said support pallets and cover pallets interlocking with one another.

4. A shipping system according to claim 3 wherein each of said support pallets and said cover pallets has rails defining interlocking structures therefor.

5. A shipping system according to claim 1 wherein each said support pallet is sized and adapted to support a plurality of stacked ensembles of cartons organized as columns thereon.

6. A shipping system according to claim 1 wherein at least some of said flexible containers have RF transmitters secured thereto, each said RF transmitter operative to transmit a unique identifier signal.

7. A shipping system according to claim 1 wherein at least some of said containers further include;
    (A) a removable label including a strip constructed of a selected strip material and having an area adapted to receive information corresponding to an address of an intended recipient of the received parcel and a layer of a selected adhesive; and
    (B) a label panel secured to said container body, said label panel including an exposed surface portion formed of a material to which the selected adhesive will adhere sufficiently to retain the label on the container body during shipment yet from which the label may be forcefully removed without tearing said strip material.

8. A shipping system according to claim 7 wherein said label panel is formed by a layer of plastic material coated with polytetrafluoroethylene, said layer being affixed to one of said first and second body panels.

9. A shipping system according to claim 7 wherein said material on the exposed surface area is polytetrafluoroethylene.

10. A shipping system according to claim 1 wherein at least some of said containers further include:
    (A) a locking structure and
    (B) a locking member operative to engage said locking structure and movable into a locked state thereby to secure the closure in the closed position.

11. A shipping system according to claim 1 wherein each said closure is a zipper having a pull tab.

12. A shipping system according to claim 11 wherein at least some of said containers further include:
    (A) a first grommet disposed on said first body panel and
    (B) a second grommet disposed on said second body panel, each of said first and second grommets located proximately to said pull tab when said zipper is closed thereby to define a locking structure and including a locking member operative to engage said first and second grommets and said pull tab thereby to secure the zipper in the closed position.

13. A shipping system according to claim 12 wherein said locking member includes a cable tie.

14. A shipping system according to claim 1 wherein said first and second body panels are formed with a multi-layered construction including a cushioning layer interposed between first and second fabric layers.

15. A shipping system according to claim 14 wherein at least some of said containers further include a signal transmitter secured thereto.

16. A shipping system adapted to be used to transport parcels between a sender location and a recipient location, comprising:
　(A) a plurality of flexible containers each having an interior adapted to receive a parcel for shipment to an intended recipient, each said container including:
　　(1) first flexible body panel and a second flexible body panel, said first and second body panels of similar size and shape and joined about a majority of the perimeter thereof to define a container body having a sealed edge with an unjoined portion defining a mouth communicating with the interior;
　　(2) a closure movable between
　　　(a) an open position such that a parcel may be inserted into the interior and removed from the interior and
　　　(b) a closed position to retain the received parcel in the interior as a received parcel;
　　(3) a label panel secured to said container body, said label panel including an exposed surface portion formed of a material different than said container body yet to which material the selected adhesive will adhere sufficiently to retain the label on the container body during shipment yet from which the label may be forcefully removed without tearing said strip material;
　　(4) a removable label including a strip constructed of a selected strip material and having an area adapted to receive information corresponding to an address of an intended recipient of the received parcel and a layer of a selected adhesive;
　(B) a plurality of cartons each having a bottom and a surrounding side wall forming a carton interior,
　　(1) each said carton adapted to receive a plurality of said flexible containers with received parcels in the carton interior thereof as a filled carton;
　　(2) a plurality of said filled cartons being stackable one on top of another as a stacked ensemble;
　(C) a plurality of support pallets, each said support pallet adapted to support at least one stacked ensemble of filled cartons placed thereon as a supported ensemble;
　(D) a plurality of cover pallets, each said cover pallet adapted to be placed over at least one supported ensemble; and
　(E) connector assemblies adapted to fasten a respective said support pallet to a respective said cover pallet that is positioned over the supported ensemble as a pallet pair thereby to secure said pallet pair together to define a palletized load.

17. A shipping system according to claim 16 wherein said label panels are formed by a layer of plastic material coated with polytetrafluoroethylene, said layer being affixed to one of said first and second body panels.

18. A shipping system according to claim 16 wherein said material on the exposed surface portion is polytetrafluoroethylene.

19. A shipping system according to claim 16 wherein at least some of said containers further include:
　(A) a locking structure and
　(B) a locking member operative to engage said locking structure and movable into a locked state thereby to secure the closure in the closed position.

20. A shipping system according to claim 16 wherein each said closure is a zipper having a pull tab and wherein at least some of said containers further include:
　(A) a first grommet disposed on said first body panel and
　(B) a second grommet disposed on said second body panel, each of said first and second grommets located proximately to said pull tab when said zipper is closed thereby to define a locking structure and including a locking member operative to engage said first and second grommets and said pull tab thereby to secure the zipper in the closed position.

21. A shipping system adapted to be used to transport parcels between a sender location and a recipient location, comprising:
　(A) a plurality of flexible containers each having an interior adapted to receive a parcel for shipment to an intended recipient, each said container including:
　　(1) first and second flexible body panels joined about a majority of the perimeter thereof to define a sealed edge with an unjoined portion defining a mouth communicating with the interior;
　　(2) a closure movable between
　　　(a) an open position such that a parcel may be inserted into the interior and removed from the interior and
　　　(b) a closed position to retain the received parcel in the interior as a received parcel;
　(B) at least eight cartons each having a bottom and a surrounding side wall forming a carton interior with an open top region opposite the bottom,
　　(1) each said carton adapted to receive a plurality of said flexible containers with received parcels in the carton interior thereof as a filled carton;
　　(2) a plurality of said filled cartons being stackable one on top of another as a stacked ensemble with adjacent ones of said cartons in each stacked ensemble interlocking with one another and with a upper carton forming a closure for a lower carton;
　(C) a support pallet adapted to support at least four stacked ensembles of filled cartons placed thereon as a supported ensemble array;
　(D) a cover pallet adapted to be placed over at least one supported ensemble array with said cover pallet operative to enclose the open top regions of each uppermost carton in each of said stacked ensembles; and
　(E) connector assemblies adapted to fasten a respective said support pallet to a respective said cover pallet that is positioned over the supported ensemble as a pallet pair thereby to secure said pallet pair together to define a palletized load.

22. A shipping system according to claim 21 wherein said support pallets and said cover pallets have a common construction.

23. A shipping system according to claim 21 wherein said support pallets and said cover pallets are constructed such that two palletized loads may be stacked one on top of another with adjacent ones of said support pallets and cover pallets interlocking with one another.

24. A shipping system according to claim 23 wherein each of said support pallets and said cover pallets has rails defining interlocking structures therefor.

* * * * *